June 5, 1962 J. K. JACOBSON 3,037,549
TIRE MOUNTING APPARATUS
Filed May 31, 1960 2 Sheets-Sheet 1
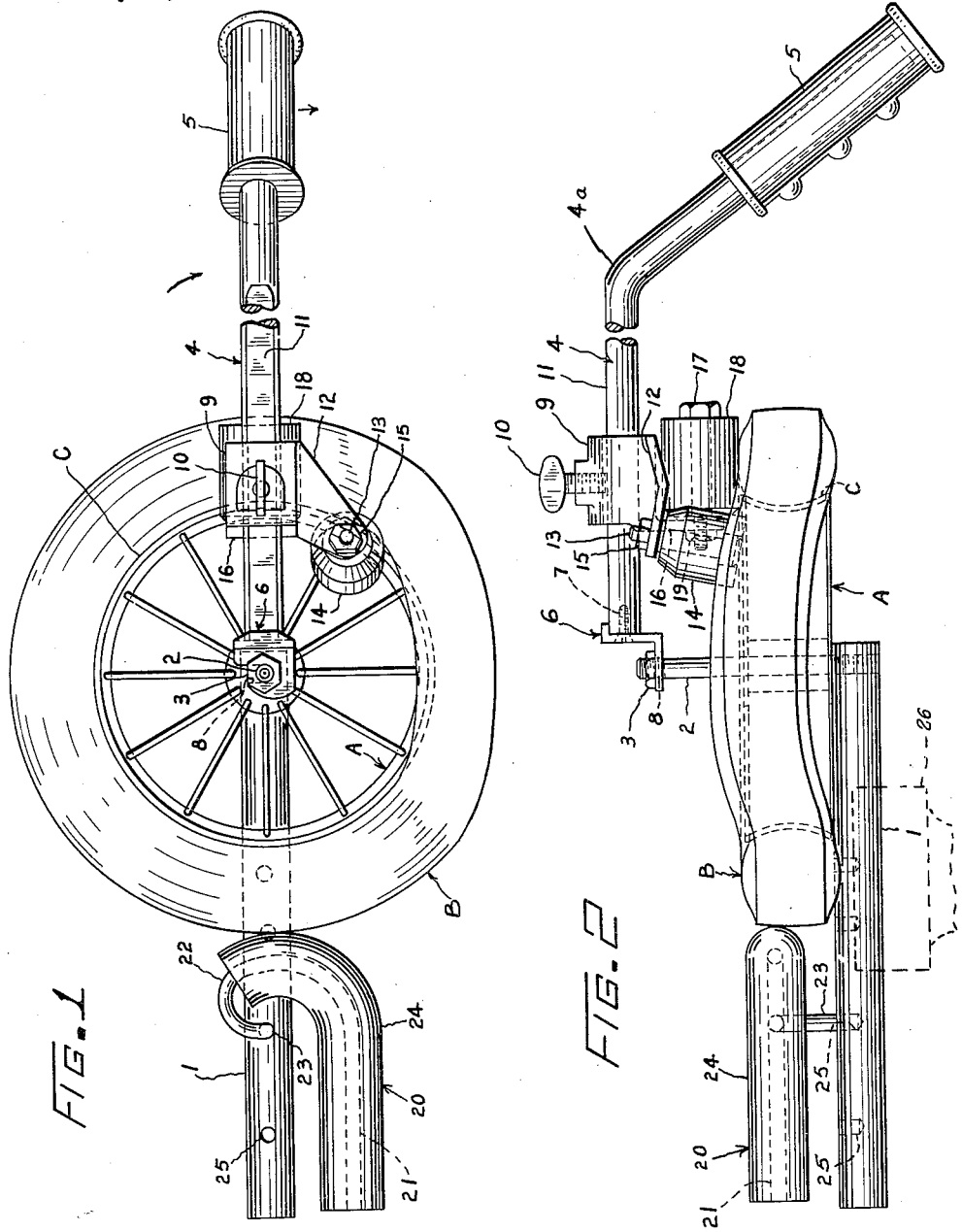
INVENTOR.
JULIAN K. JACOBSON
BY
ATTORNEY

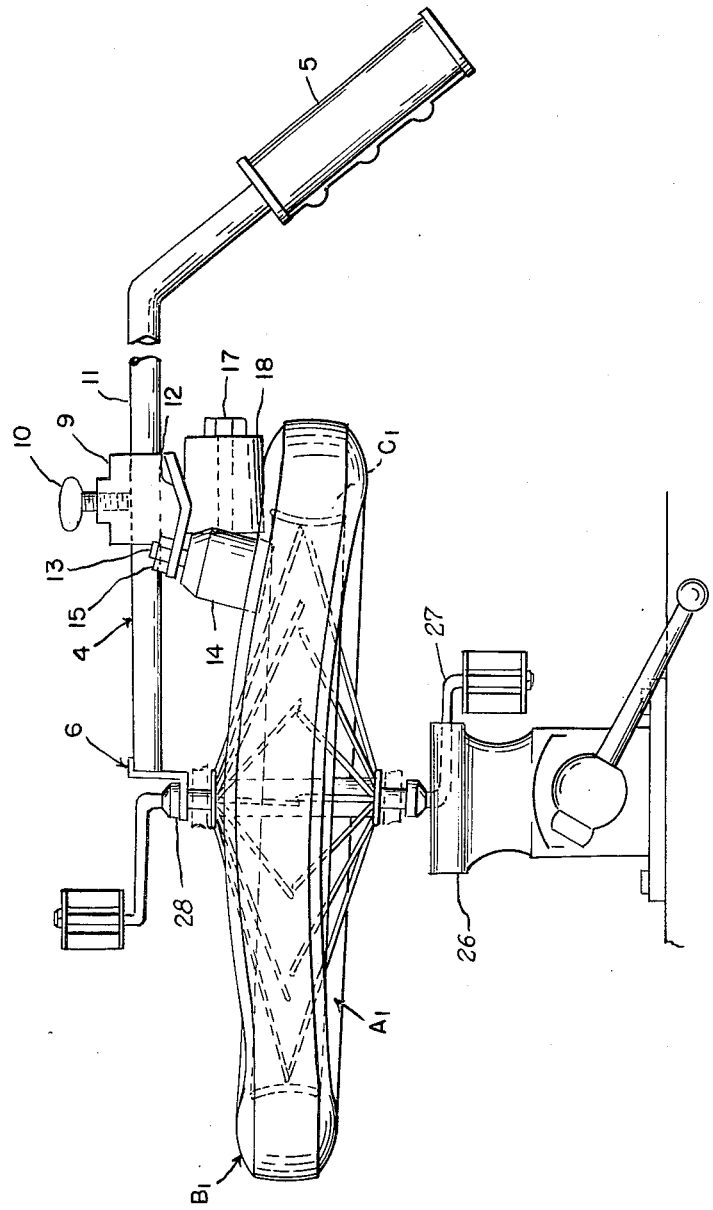

United States Patent Office 3,037,549
Patented June 5, 1962

3,037,549
TIRE MOUNTING APPARATUS
Julian K. Jacobson, 14781 Novare, Detroit, Mich.
Filed May 31, 1960, Ser. No. 32,628
5 Claims. (Cl. 157—1.22)

This invention relates to an apparatus for mounting a tire such as a semi-pneumatic tubeless tire on the rim of a wheel, and more particularly to an apparatus constructed to receive a wheel with a tire initially partially seated on the rim thereof, and to progressively seat the unmounted portion of the tire upon the rim.

An object of the invention is to facilitate the assembly of wheels by providing a base support to receive a wheel and tire and a means coacting with the base to install the tire.

A further object is to provide means to clamp the tire against the rim to maintain said initial seating.

A further object is to provide means coacting with a spindle to progressively stress a portion of the tire radially outwardly from the rim.

Another object is to provide means to urge such stressed portion of the tire to a position in which it confronts said rim and is relieved of said stress to retract into a seated position on the rim.

A further object is to facilitate the assembly of wheels having cranks by providing a simplified adjustable mechanism coacting between the crank and the tire to stretch and seat the tire on the rim of the wheel.

For a more complete understanding of the invention, reference may be had to the accompanying drawings illustrating preferred embodiments of the invention in which like reference characters refer to like parts throughout the several views and in which FIG. 1 is a plan view of a preferred apparatus embodying the invention.

FIG. 2 is an elevational view of the apparatus as taken on the line 2—2 of FIG. 1, and FIG. 3 is an elevational view illustrating the installation of a tire on a crank wheel.

In FIGS. 1 and 2 the reference character 1 designates a preferred support base formed of a length of elongated rod, which may be rigidly secured for use in any convenient manner, as by clamping between the jaws of a vise indicated by dot-dash lines 26 in FIG. 2. Preferably the base is secured in a substantially horizontal position as illustrated. A wheel receiving spindle 2 extends preferably transversely to and upwardly from the base, and has its lower end portion threaded into or otherwise secured to the base. The upper end portion of the spindle is threaded to receive a nut 3.

A lever 4 is bent as at 4a and preferably formed at its outer end with a handle 5. An angle bracket 6 is secured to the inner end of the lever by any means such as a screw 7 extending through the vertically disposed flange of the bracket 6. The horizontally disposed flange of the bracket 6 is provided with a notch 8 adapted to engage the spindle 2 under the nut 3, thus affording a rotative swinging of the lever about the longitudinal axis of the spindle.

A carriage 9 is mounted upon the lever for sliding travel longitudinally thereof between selective positions thereon, and may be secured in any desired position as determined by the size of the wheel, to be described, by tightening a thumb screw 10 until its lower end bears upon a flat surface 11 formed longitudinally on the lever. Provision of the flat surface 11 affords resistance to rotational movement of the carriage 9 when the thumb screw is tightened.

The carriage 9 is formed with a laterally projecting flange 12. A shoulder screw 13 revolubly mounts a first roller 14, and has its threaded end portion extending through the flange 12 to receive a nut 15 which secures the shoulder screw 13 and roller 14 in position beneath the flange 12. The plane of the flange 12 diverges slightly upwardly from the horizontal, thus inclining the rotational axis of the roller 14 toward the base of the spindle 2.

A second flange 16 projects downwardly from the carriage 9. A shoulder screw 17 rotatably mounts a second roller 18 on the flange 16, and has its threaded end portion extending through the flange 16 to receive a nut 19 which secures the shoulder screw 17 and roller 18 in position outwardly of the flange 16 and on an axis substantially parallel with the longitudinal axis of lever 4.

A clamp 20, formed of a length of rod, has an elongated handle 21, a central portion 22 arcuately curved and terminating in a stub end 23 bent transversely to the plane of the curved portion 22. As explained further below, the curved portion 22 engages the thread of a tire B to clamp said tire against a wheel rim C. It is therefore preferred to encase such curved portion in a sheath or tube 24 of rubber or the like to increase resistance of the clamp to any undesired movement of the tire.

The stub end 23 is selectively inserted in any of a plurality of sockets 25 formed in the base 1, and is pivotally received therein. Each of such sockets is preferably predeterminedly spaced from the spindle 2 to accommodate the clamp for use with tires of any desired radii.

In use of the apparatus as shown in FIGS. 1 and 2, a wheel A is placed on the spindle 2 and the nut 3 is securely threaded upon the upper end of said spindle 2. A tire B is positioned on the wheel A with a portion of the tire initially seated on the rim C of the wheel A. The stub end 23 of the clamp 20 is inserted in an appropriate socket 25, and the clamp 20 is manually pivoted about the pivotal axis established by the socket 25 to engage the arcuate portion 22 of the clamp 20 against the tread of that portion of the tire initially seated on the rim C. Pressure may thus be applied on the tire B to retain it on the rim C and prevent the wheel A from rotating.

The carriage 9, being properly positioned, and secured in such position on the lever 4, the notch 8 in the angle bracket 6 is engaged on the spindle 2 below the nut 3 for rotative swinging of the lever 4 about the spindle, which causes the roller 14 to engage the inner circumference of the tire B and stress the portion of the tire at the point of engagement radially outwardly from the rim C for subsequent seating of that portion on the rim C.

The roller 18 is caused to engage the uppermost sidewall of the portion so stressed. Prior to applying rotational force to the handle 5, the lever 4 is positioned so that the axes of the roller 18 and the lever 4 are contained in a plane angularly disposed with respect to the axis of the spindle 2. The notch 8 in the bracket 6 permits slight rotation of the lever 4 on its longitudinal axis and the bent handle 5 tends to produce this rotation as force is applied to the handle 5 in a plane substantially parallel to the plane of the wheel A. As the lever 4 rotates on its longitudinal axis the roller 18 moves in a slight arc about the axis of the lever 4 toward a position in which the axes of the roller 18, the lever 4 and the spindle 2 are substantially co-planar. The roller 18 moves downwardly toward the rim C as this position is approached urging the stressed portion of the tire downwardly to confront the wheel rim C. This rotative force also disengages the stressed portion of the tire B from the roller 14, allowing such portion to retract and seat upon the wheel rim C. The nut 3 on the spindle 2 resists upward escape of the bracket 6 from said spindle in reaction to the forces applied as described.

It is to be noted that the inclination of the rotational axis of the roller 14 toward the base of the spindle facilitates disengagement of the tire B from the roller 14.

The application of force on the lever 4 toward the wheel rim C, and of rotational swinging of the lever 4 as described, occur concurrently, and are continued to progressively seat the tire on the rim.

While it is preferred to use the apparatus with the base 1 secured in a horizontal position, it will be obvious that the apparatus is operable with the base 1 secured in other positions.

It will also be seen that since the apparatus engages only the axle hole of the wheel A, it is adaptable for installing tires on many types of wheels, including spoked wheels, without the danger of damaging the spokes or other wheel parts.

The lever 4 of the apparatus may be used as indicated in FIG. 3 to install tires on other types of wheels which may not readily be carried on the spindle 2.

In FIG. 3, wheel A', having a crank 27 assembled therewith, is supported by clamping the crank 27 in a vise 26 or any desired device. The crank, taking the place of the spindle in this case, is provided with a bearing element 28 or the like under which the bracket 6 may be inserted.

It will be noted that in any case, regardless of the type of wheel, the inclined roller 14 leads the horizontal roller 18, the lever 4 always being turned in the clockwise direction as seen in FIG. 1. In using the crank wheel $A_1$, of FIG. 3, the initially seated portion of the tire $B_1$, is preferably retained by hand on the rim $C_1$.

Although I have described only two embodiments of my invention, it will be apparent to one skilled in the art to which the invention pertains that various changes and modifications may be made therein without departing from the spirit of the invention or the scope of the appended claims.

What I claim is:

1. An apparatus for mounting a tire upon a wheel rim and comprising an elongated base, a spindle fixed to and extending transversely to said base and adapted to receive a wheel with a tire partially seated on the rim thereof, a clamp releasably engageable with the tire to maintain such seating, said base being formed with a plurality of spaced sockets disposed radially from the spindle, said clamp comprising a rod having an arcuately curved central portion for clamping against a tire, an elongated handle formed on one end of said rod, a stub formed at the opposite end of said rod and projecting transversely to the plane of said central portion, said sockets selectively receiving said stub, and said stub being pivotal in a socket to swing said central portion into engagement with a tire, said sockets being each predeterminedly spaced from the spindle to accommodate the clamp for use with a tire having a known radius, and elongated lever having an outer end formed with a handle and an inner end adapted to releasably engage the spindle for rotative swinging of the lever substantially about the longitudinal axis of the spindle and for movement of said lever toward the wheel rim responsive to force applied to said handle, said spindle having means operable to resist escape of said inner end of the lever from the spindle when said force is applied, a first means carried by the lever and responsive to said rotative swinging to engage a portion of the inner circumference of the tire and stress such portion radially outwardly from the wheel rim for subsequent seating thereon, and a second means carried by said lever and responsive to application of said force to urge such portion into a position confronting the wheel rim and of disengagement from said first means, thus affording retraction of such portion to seat on the wheel rim, the application of said force and said rotative swinging occurring concurrently, whereby said tire is progressively seated on the wheel rim.

2. In an apparatus for mounting a tire upon a wheel rim, comprising a support, a spindle adapted to carry a wheel rotatably on its axis, and a clamping means carried on said support for resisting rotation of said wheel, said clamping means comprising a rod rotatably supported on said support on an axis parallel to said spindle and radially outwardly spaced from said wheel, said rod having a substantially spirally curved portion disposed in a plane normal to the axis of the rod and centered on said rod axis, whereby rotation of the rod about its axis effects a clamping engagement and disengagement with the periphery of a tire carried on said wheel rim.

3. The apparatus as defined in claim 2 and in which said rod includes a substantially straight portion extending from the outer end of the spirally curved portion and in the plane thereof to form a handle.

4. An apparatus for mounting a tire upon a wheel rim and comprising an elongated base, a spindle fixed to and extending transversely to said base and adapted to carry a wheel with a tire partially seated on the rim thereof, a clamp releasably engageable with the tire to maintain such seating, an elongated lever having a downwardly bent handle portion at an outer end and an inner end being provided with a bracket, said bracket having portions releasably engaging said spindle for rotative swinging of said lever substantially about the longitudinal axis of said spindle, said bracket being provided with a notch opening to said spindle engaging portions whereby permitting said lever to rotate slightly about its longitudinal axis, said spindle having means operable to resist escape of said bracket from said spindle when rotative force is applied to said handle, a first means carried by said lever and responsive to said rotative force to engage a portion of the inner circumference of the tire and stress such portion radially outwardly from the wheel rim for subsequent seating thereon, and a second means carried by said lever and responsive to the application of said rotative force to urge such tire portion into a position confronting the wheel rim and disengaging from said first means, thus affording retraction of such portion to seat on the wheel rim, said second means comprising a roller having a longitudinal axis coplanar with the longitudinal axis of said lever, said roller being first positioned so that the plane containing said coplanar axes are angularly disposed with respect to the longitudinal axes of said spindle whereby as rotative force is applied to said bent handle portion a portion of said force tends to rotate said lever slightly about its longitudinal axis causing said roller to rotate slightly about the longitudinal axis of said lever toward a position such that the axes of said spindle, said lever and said roller are all coplanar, said rotation of said roller about said lever being operable to urge said tire portion toward said rim as said roller moves toward said position.

5. An apparatus for mounting a tire upon a wheel rim, comprising a support, means selectively carrying a wheel on said support, a lever means rotatably carried by said support on an axis substantially common to the wheel axis, a first and second means carried by said lever means and engageable respectively with the inner edge and the sidewall of a portion of the tire, said first and second means being simultaneously cooperable on rotational movement of said lever means to stress said tire portion radially outwardly from the wheel rim and to urge said tire portion into a position confronting the wheel rim and disengaging from the first means, whereby said tire second portion will retract into said rim, said lever means comprising a rod having its longitudinal axis extending substantially radially with respect to its axis of rotation, said rod being provided with a bracket at one end, said bracket being provided with an elongated slot, said support being provided with a spindle rotatably carrying said wheel, said spindle having means selectively preventing said bracket from moving away from said spindle, said elongated slot in the bracket rotatably engaging said spindle whereby sufficient rotation of said bracket and said lever about their longitudinal axis is permitted to apply forces through said second means substantially parallel to the axis of said spindle.

References Cited in the file of this patent

UNITED STATES PATENTS

| | | |
|---|---|---|
| 611,864 | Mathisen | Oct. 4, 1898 |
| 965,076 | Carle | July 19, 1910 |
| 1,566,377 | Currente | Dec. 22, 1925 |
| 1,587,634 | Dickey et al. | June 8, 1926 |
| 2,505,172 | Coats | Apr. 25, 1950 |
| 2,528,362 | Hauta | Oct. 31, 1950 |
| 2,698,652 | Gardner | Jan. 4, 1955 |
| 2,845,969 | Duquesne | Aug. 5, 1958 |
| 2,873,777 | Thostenson | Feb. 17, 1959 |

FOREIGN PATENTS

| | | |
|---|---|---|
| 176,323 | Canada | Apr. 10, 1917 |
| 811,073 | Great Britain | Apr. 2, 1959 |